C. DE BOCK.
PROCESS OF STERILIZING MILK.
APPLICATION FILED OCT. 17, 1912.
1,074,315.
Patented Sept. 30, 1913.
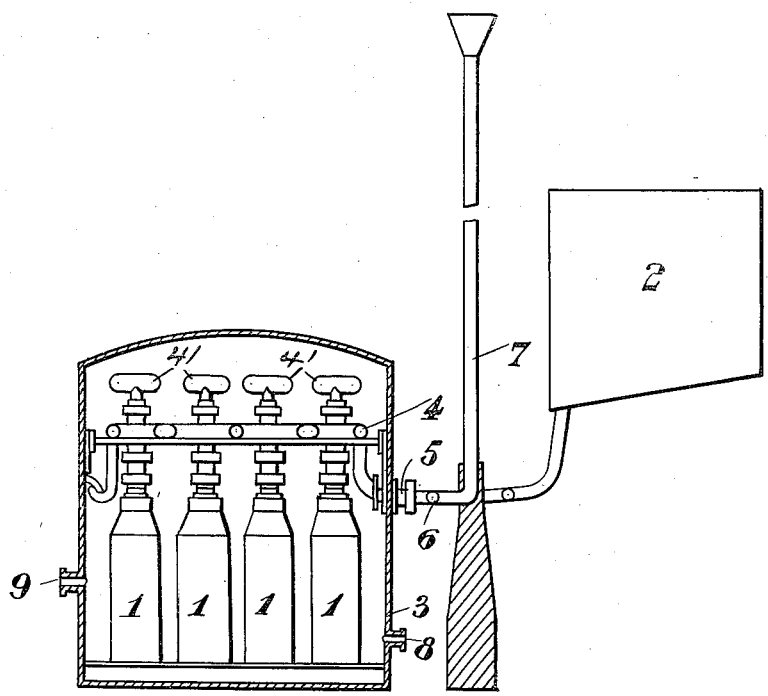

UNITED STATES PATENT OFFICE.

CHARLES DE BOCK, OF ZELE, NEAR DENDERMONDE, BELGIUM.

PROCESS OF STERILIZING MILK.

1,074,315. Specification of Letters Patent. Patented Sept. 30, 1913.

Original application filed March 7, 1911, Serial No. 612,940. Divided and this application filed October 17, 1912. Serial No. 726,349.

*To all whom it may concern:*

Be it known that I, CHARLES DE BOCK, captain commandant, a citizen of the Kingdom of Belgium, and resident of Zele, near Dendermonde, Belgium, have invented certain new and useful Improvements in Processes of Sterilizing Milk, being a division of my application Serial No. 612,940, filed March 7, 1911, patented February 4, 1913, No. 1,052,210; and I do hereby declare the following to be a full, clear, and exact description of the invention, such as will enable others skilled in the art to which it appertains to make and use the same, reference being had to the accompanying drawings, and to letters or figures of reference marked thereon, which form part of this specification.

The present invention relates to a process of sterilization of milk and other liquids, by heating the liquids, under pressure, in their receptacles and transporting or dispensing vessels themselves, without altering the constituents thereof or the physical properties by the operation of sterilization and without, after this operation of sterilization, the contents of the said receptacles coming, in any manner, in contact with the external atmosphere nor with any body not previously sterilized.

In order to obtain a perfect sterilization, the receptacles and their contents must be heated to sterilizing temperature, that is to a temperature sufficient to destroy all the micro-organisms and their spores. This temperature, according to Pasteur, is for milk about 110° to 115° centigrades.

According to my invention, I submit the liquid to be sterilized in its vessels, before the beginning of the sterilization and during the sterilization and during the subsequent cooling to a pressure, transmitted by the liquid to be sterilized itself. This pressure is in excess of the vapor pressure of the liquid at the sterilization temperature, so that there cannot occur, during the operation, any decomposition or change in the liquid by reason of the high temperature required for its sterilization. For the sterilization of milk, this pressure is from two to four atmospheres.

It has already been proposed to sterilize in closed vessels, but pressure has not been applied to their contents before the heating of them has commenced, consequently the pressure inside these vessels only gradually rises as the operation of heating progresses and is produced solely by means of the pressure of the vapors produced inside the vessel. The consequence is that, if there is no sufficient pressure on the contents of the vessels at the beginning of the operation, during and after this operation, one may not prevent the decomposition or change of said contents. It has also been proposed to submit the liquid to be sterilized to the pressure of a gas; in consequence of the composition of the materials and in consequence of the pressure, this gas penetrates into the liquid and alters the chemical and physical properties thereof. For instance, if the milk is submitted during its sterilization to a pressure of carbonic acid, this gas penetrates into the milk and one obtains milk with froth which has no longer the properties of natural milk.

It must be noted that according to my invention, the pressure maximum, to which the liquid is subjected during the operation, is applied before any heating; it must further be noted that the required pressure is transmitted to the liquid by means of the liquid itself. This manner of transmission of the pressure and the applying of the pressure maximum before any heating distinguish the present invention from all processes wherein the liquid is submitted to the pressure of a gas.

In the drawing the dispensing vessels 1 are placed in an autoclave or sterilizing apparatus, 3. In said autoclave is a pipe system 4 having suitable valves 41 to admit the liquid to the vessels 1. The pipe system 4 in the autoclave or sterilizer 3 is connected by pipe 5 to a line pipe 6 to which several sterilizing vessels 3 may be connected. A standpipe 7 is connected to the line pipe 6, or, as the case may be, to the pipe 5. This pipe is of a height sufficient to produce the required hydrostatic pressure in the vessels 1. A tank 2 may be connected to the pipe, 6 or 5, to supply liquid to empty dispensing vessels 1. Hot water is admitted to the autoclave 3 at 8, and is discharged therefrom at 9.

A more detailed description of this apparatus will be found in my U. S. Patent No. 1,052,210, dated February 4, 1913.

I claim:

A process of sterilization which comprises placing the liquid to be sterilized in the transporting or dispensing vessels, by submitting this liquid, by means of the liquid itself, before the heating producing the sterilization and during the entire heating and subsequent cooling period, to a pressure greater than the maximum vapor pressure at the maximum temperature required for obtaining the entire and complete sterilization.

In testimony whereof I affix my signature in presence of two witnesses.

CHARLES DE BOCK.

Witnesses:
    G. VAN DER HAUGHEN,
    PAUL TART.